June 7, 1960
A. BARSAM, JR
2,939,643
REMOVABLE SPINDLE REWIND MECHANISM
Filed Oct. 17, 1955
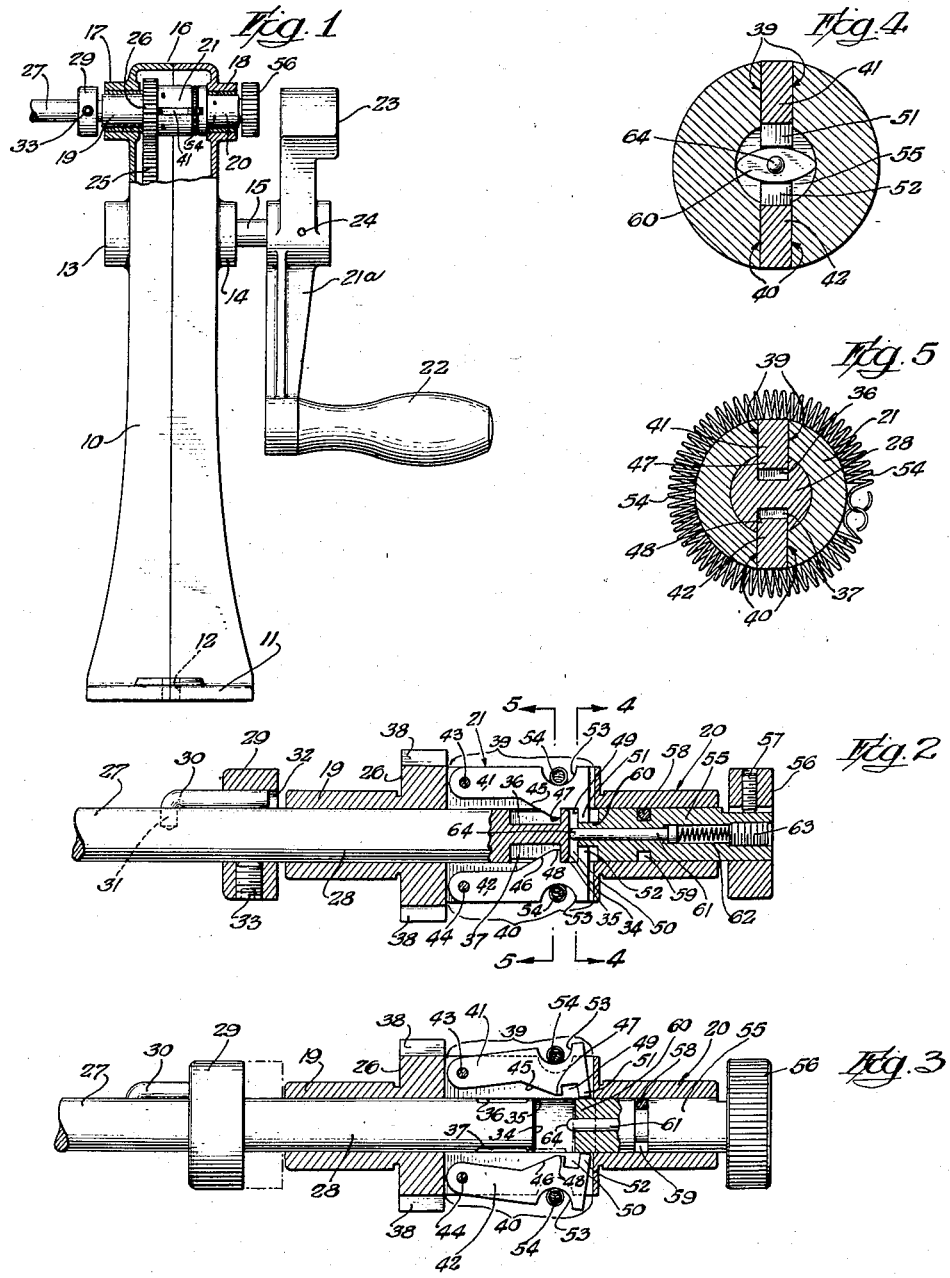
INVENTOR.
ARTHUR BARSAM JR.
BY
Fulwider, Mattingly + Huntley
ATTORNEYS.

United States Patent Office 2,939,643
Patented June 7, 1960

2,939,643

REMOVABLE SPINDLE REWIND MECHANISM

Arthur Barsam, Jr., 914½ N. Fairfax,
Los Angeles, Calif.

Filed Oct. 17, 1955, Ser. No. 540,936

13 Claims. (Cl. 242—55.11)

This invention relates to devices, generally called rewinds, for winding motion picture film, sound track film and tapes, and other ribbon-like materials from one reel to another, and more particularly to a rewind having a lock and release mechanism by means of which the spindle supporting the reel is easily removed and replaced by a substitute spindle of different length.

Hand operated film rewinds have been constructed in the same general manner since the early days of silent films. A typical rewind consists of an upright frame in which a large and a small spur gear are journalled, the large gear being fixedly attached to a hand crank shaft and the small gear attached to a shaft extending outwardly from the frame on the side opposite the hand crank. The shaft terminates in a spindle portion having a driving key enterable in a slot in the hub of a reel and a rounded tip portion pivoted to swing laterally to a position radially disposed to the spindle axis, thereby locking the reel on the spindle and in locked engagement with the driving key thereof.

Rewinds for 16 mm. and 8 mm. film have been small sized counterparts of the standard 35 mm. film rewinds, but since the spindles of rewinds have usually been assembled in fixed attachment within their bearings, it has been necessary to have separate rewinds for each width of film. The spindle diameter was the one structural feature which remained the same in rewinds of all sizes, although driving key means of different conformations were employed on the smaller sizes.

Since the advent of sound film, editors and laboratory technicians have used rewinds with spindle long enough to accommodate two or more reels so that the sound track and the picture films may be juxtaposed on one spindle and handled simultaneously and in matching lineal synchronization. Obviously, rewinds having longer spindles have been required for this purpose. And now the so-called wide screen film, with frames more than twice as wide as high, serves to further complicate the rewind problem for the laboratory technician and the cutter, and also requires modification of the hand and motor driven film handling equipment in theatres exhibiting the wide film.

From the foregoing the need for a film rewinding device adapted to receive and drive spindles of various lengths and having various driving key means can readily be seen, and with this in mind the present invention has the following important objects:

A major object of this invention is the provision of a film winding device having a spindle driving mechanism adapted to receive a spindle of any predetermined length and lock it securely in the driving position.

Another important object of this invention is the provision of a film winding device having a spindle driving mechanism, as previously described, and adapted further to release the spindle from locked engagement in response to a single simple manual movement of the operator without the use of special wrenches or tools.

A further important object of this invention is the provision of a film winding device having a spindle driving mechanism with fully automatic spindle locking means requiring only that the spindle be bottomed in the center bore of the drive shaft and the shaft rotated slightly to assure the locked positioning of the spindle therein.

Another object of the present invention is the provision of a spindle driving mechanism having the features previously described and also being adapted with means to force the spindle outwardly of the drive shaft bore when the locking means are released.

In brief, my invention includes a generally conventional rewind having a hollow drive shaft adapted to receive the shank end of a spindle and having spring tensioned latch members appurtenant to the shaft adapted to hold the spindle shank in rotative as well as coaxial longitudinal engagement. A spindle is released from locked engagement within the shaft by a quarter turn of a knurled knob disposed at the end of the shaft adjacent the winding crank. This mechanism makes possible the quick and convenient change from one spindle to another of any predetermined length and having the proper keying means for driving the reel to be handled.

Other distinguishing features and important objects of this invention will become apparent in the following description of one preferred embodiment thereof and will be seen in the accompanying drawings in which:

Figure 1 is an elevation and fragmentary sectional view showing a complete rewind device with a portion of the upper housing broken away to show the removable spindle mechanism and shaft assembly covered by this invention;

Figure 2 is a view of the spindle drive mechanism showing the various parts of the shaft assembly in longitudinal section taken along the axis of a spindle locked in operating position therein;

Figure 3 is a view similar to Figure 2 in which only the hollow shaft is shown in axial section, and the movable parts of the assembly are shown in the unlocked or releasing position;

Figure 4 is a view showing a through section of the shaft assembly taken in the direction and at the point indicated by arrows 4 in Figure 2, revealing the manner in which the cam end of the release pin engages the latch members; and Figure 5 is a view similar to Figure 4 showing a through section of the shaft assembly at the point and in the direction indicated by arrows 5 in Figure 2, and shows the latch members entered in the driving position in longitudinal grooves in the spindle under tensional urge of a circular coil spring.

Referring again to Figure 1 which shows the general structure of a conventional film or tape winding device, the numeral 10 designates the combined housing and supporting frame of a typical rewind having basal flanged sections as shown at 11 with bores 12 by which it is bolted to a suitable work surface. The housing 10 is extended on both sides at the intermediate vertical points 13 and 14 to provide support for journal members of the crankshaft 15, and similarly near the top 16 at opposite points 17 and 18 to support the journal members 19 and 20 of the tubular body of the drive shaft 21.

Although many rewinds similar to the typical device shown in Figure 1 are motor driven, the particular unit shown in the drawing is intended for manual operation being provided with a rotatable crank arm 21a having an outwardly extended handle 22 at one end and an enlarged section 23 at the other end of sufficient weight to counterbalance the handle 22. The crank arm 21a is pin fastened at 24 to the crank shaft 15 to which a large spur gear, partially seen at 25, is fixedly attached. A pinion gear 26 which is engaged by the large spur gear 25 is formed integrally with the tubular drive shaft body 21 into which a reel supporting spindle 27 is entered and held in locked engagement by the particular mechanism of the present invention better seen in Figure 2.

Since it is conformed so as to cooperate with elements of the drive shaft mechanism, the spindle member can be considered a part of this invention. For descriptive clarity it is best described as including, in addition to the reel supporting spindle portion 27, a shank portion 28, a spacing collar 29, and a driving key 30. The driving key 30 shown in this particular embodiment is the type customarily used to drive conventional 35 mm. reels and consists of an L-shaped section of round rod, the short portion thereof being entered in a bore, 31 in Figure 2, in the spindle and the long portion being entered in a keyway 32 in the collar 29, the latter, in turn, being secured to the spindle 27 by means of a set screw 33.

As previously mentioned, keys of different conformations are customarily used to drive reels for other sizes of film and tapes, and the present invention is completely amenable to any necessary modification in that respect and is not to be limited in scope to the type shown herein or the use indicated thereby.

Regardless of the keying method used on the spindle portion 27, the shank portion 28 has the same general conformation, being a straight longitudinal extension of the spindle body 27 and terminated in a flat transverse face 34 having a bevel 35 around the circumferential edge thereof. Two longitudinal slots, 36 and 37 in Figures 2, 3, and 5, are disposed inwardly of the spindle shank 28 from diametrically opposite positions on the periphery thereof adjacent the transverse end face 34. These slots are clearly shown in longitudinal section in Figure 2, in the plan view of the shank 28 in Figure 3, and in the cross section taken along line 5—5 of Figure 2 as shown in Figure 5.

Details of the hollow drive shaft assembly are best seen in Figure 2. The main body portion of the shaft is generally tubular in form having journal sections 19 and 20 disposed at opposite ends thereof, a central section of increased diameter intermediate of the journal sections and a smaller intermediate section of greatest diameter provided with gear teeth 38 comprising the pinion gear 26 which engages the driving gear 25.

In the central section of increased diameter are two axially aligned diametrically opposite longitudinal slots 39 and 40 disposed through opposite sides of the tubular side wall in which latch members 41 and 42 are pivoted on pins 43 and 44 so that they rotate in the same axiodiametric plane relative to the axis of the shaft. The latch members 41 and 42 have two inwardly disposed projections adjacent the ends thereof spaced from the pivots 43 and 44, the inner edges of the latch members being slanted outwardly as shown at 45 and 46 to the outermost point of the first of the projections 47 and 48, and being indented as at 49 and 50 between the first projections 47 and 48 and the second projections 51 and 52.

The latch members are dimensioned and pivoted so that when their outer edges are flush with the outer periphery of the central shaft section, their two projections extend inwardly of the central bore as shown in Figure 2. A coil spring 54, the ends of which are attached to form a continuous loop, is positioned in a circumferential groove 53 disposed in both the outer periphery of the shaft body and in the outer edges of the latch members, and serves to hold the latch members 41 and 42 within the slots 39 and 40.

A release pin 55, to which a knurled knob 56 is fixedly attached by a set screw 57, is entered into the bore of the tubular shaft from the end opposite the spindle 27 and held therein by an off-center pin 58 positioned in through bores in the tubular wall of the shaft so as to engage a circumferential groove 59 in the release pin 55. The inner termination 60 of the locking pin 55 is reduced from the generally cylindrical form of the pin to an ovaloid conformation, as best seen in the cross-sectional view of Figure 4, which is positioned between the projections 51 and 52 of the latch members 41 and 42.

A plunger member 61 is positioned within an axial bore in the release pin 55 and pressed inwardly thereof by a compression spring 62 which is held within the bore by a set screw 63. The inner end 64 of the plunger 61 extends through the ovaloid end 60 of the release pin as seen in Figures 2, 3, and 4.

The operation of the rewind spindle lock and release mechanism of my invention is simple and efficient. The shank portion 28 of the spindle 27 is entered into the bore of the tubular drive shaft 21. The beveled edge 35 of the end face 34 engages the slanted edges 45 and 46 of the latch members 41 and 42 which, under tension of the coil spring 54, are normally disposed within the bore of the shaft. As the spindle shank 28 is pressed inwardly, the latch members move outwardly of the slots 39 and 40 until the end face 34 of the shank is bottomed in the bore against the inner face 60 of the release pin 55. Rotation of the spindle a half turn or less brings the slots 36 and 37 in the shank in diametric alignment with slots 39 and 40 in the shaft wall permitting the projections 47 and 48 of the latch members 41 and 42 to move inwardly into the slots 36 and 37 in the shank 28, thereby securing the shank and spindle in rotative as well as co-axial longitudinal engagement.

Release of the spindle member is also quickly accomplished. Rotation of the knurled knob 56 a quarter turn likewise rotates the release pin 55 so that the greatest width of its ovaloid end 60 is disposed between the projections 51 and 52 of the latch members 41 and 42, thereby pressing them outwardly of the slots 39 and 40 to the position shown in Figure 3 wherein the projections 47 and 48 are completely disengaged from the slots 36 and 37. At this point of disengagement, the plunger member 61, urged inwardly by spring 62, presses against the face 34 of the shank 28 and moves the shank outwardly of the bore until the bevel 35 of the shank end face 34 is positioned outwardly of the projections 47 and 48. At this point, continued rotation of the knob 56 brings the smallest width of the ovaloid end 60 between the projections 51 and 52 of the latch members, thereby permitting the latter to move together under the urge of the spring 54. As the latch members move inwardly, their slanted edges 45 and 46 engage the beveled edge 35 of the shank end 34, thereby adding additional force to the outward movement of the shank 28.

In order to comply with the statute, this invention has been described in considerable detail in the foregoing specification and shown in the drawings in a specific embodiment including many definite details of arrangement and construction. But it is to be understood that these details have been supplied only for the purpose of illustrating one typical form of this invention, that they are subject to various changes and modifications, and that the invention, therefore, is to be limited in scope only as indicated by the extent of the following claims.

I claim:

1. A spindle driving mechanism for supporting and rotating a film reel comprising: a spindle having key means adapted to engage a film reel mounted thereon, and having an extended shank portion with notches in the periphery thereof; a generally tubular drive shaft having a central bore adapted to receive said spindle shank and having a section provided with means engageable with a power source; latch means carried by said drive shaft engageable with said notches in said spindle shank for locking said spindle in said drive shaft bore in longitudinal and rotative engagement; and means for disengaging said latch means from said spindle.

2. A spindle driving mechanism comprising: a spindle having key means adapted to engage a hub mounted thereon, and having an extended shank portion with notches in the periphery thereof; a generally tubular drive shaft having a central bore adapted to receive said spindle shank and having a peripheral section of increased diameter provided with means engageable with a power source; latch means carried by said drive shaft engageable with said notches in said spindle shank for locking said spindle in said drive shaft bore in firm longitudinal and rotative engagement; means for releasing said latch means to permit removal of said spindle from said drive shaft; and means effective to force said spindle outwardly of said bore upon release of said latch means, said spindle being dimensioned to receive a predetermined plurality of hubs thereon.

3. A spindle driving mechanism comprising: a plurality of spindle members, each having key means adapted to engage film reels mounted thereon, and having an extended shank portion with notches in the periphery thereof; a generally tubular drive shaft having a central bore adapted to receive the shank of one of said spindles and having a peripheral section of increased diameter provided with gear teeth engageable with a power supply; latch means engageable with said notches in said spindle shank for locking any one of said spindles in said drive shaft bore in firm longitudinal and rotative engagement; means for releasing said latch means to permit removal of the spindle from said drive shaft; and means effective to force said spindle outwardly of said bore upon release of said latch means.

4. A spindle driving mechanism comprising: a plurality of spindle members, each having key means adapted to engage film reels mounted thereon, and having an extended shank portion with notches in the periphery thereof; a generally tubular drive shaft having a central bore adapted to receive the shank of one of said spindles and having a peripheral section of increased diameter provided with gear teeth engageable with a power supply; latch means engageable with said notches in said spindle shank for locking any one of said spindles in said drive shaft bore in firm longitudinal and rotative engagement; means for releasing said latch means to permit removal of the spindle from said drive shaft; and means effective to force said spindle outwardly of said bore upon release of said latch means, said spindles being variously dimensioned in length to receive different pluralities of reels and reels of different sizes.

5. In a reel device for winding film and tape from one reel to another, a drive shaft assembly and a reel supporting spindle removably engageable therein, comprising: a solid spindle having a longitudinally extended shank portion with diametrically opposite longitudinally disposed peripheral notches adjacent the end thereof; a generally tubular drive shaft having a central bore adapted to receive said spindle shank and having a peripheral section of increased diameter adapted with gear teeth engageable with the crank driven gear means of the rewind device; latch means engageable with said notches in said spindle shanks for locking said spindle in said drive shaft bore; means for releasing said latch means to permit removal of said spindle from said drive shaft; and spring pressed means effective to force said spindle outwardly of said bore upon release of said latch means.

6. The invention in accordance with claim 5 in which the latch means for locking said spindle shank in said drive shaft bore comprise: a pair of latch members pivotally mounted in diametrically opposite longitudinal slots in the side wall of said tubular drive shaft, said latch members having inwardly directed projections thereon which extend into the bore of said drive shaft when said latch members are pivoted inwardly, said projections being adapted to engage said longitudinal notches in said spindle shank; and a spring means positioned around said drive shaft over said slots which engages said latch members pivoted therein and urges them inwardly to cause engagement of said projections with said notches.

7. The invention in accordance with claim 6 in which the means for releasing said latch means to permit removal of the spindle from the drive shaft comprise: a bolt-like release pin rotatably secured within said drive shaft bore and terminated inwardly in an end section of ovaloid conformation disposed between the movable ends of said latch members, and terminated outwardly in a knurled section of increased diameter, said release pin having an axial bore therethrough.

8. The invention in accordance with claim 7 in which the means effective to force said spindle outwardly of said bore comprise: a plunger member disposed within said axial bore in said release pin, the inward end thereof extending through said ovaloid end section of said release pin; a set screw threaded into the aperture of said axial bore at the knob end thereof; and spring means confined between said set screw and the outer end of said plunger urging said plunger inwardly of said bore.

9. A rewind device for film and tape comprising: a body portion defining a base and upright frame having integral journal means to receive and support a crank shaft and a drive shaft; a crank shaft journalled in said frame and having a spur gear and a crank arm fixedly attached thereto, said arm having a crank handle for manual rotation thereof; a generally tubular drive shaft journalled adjacent the top of said body frame, having peripheral gear teeth engaging those of said spur gear, and having an axial bore dimensioned to receive a reel supporting spindle; a spindle member having an extended shank portion with opposite notches in the periphery thereof, said spindle being dimensioned to support a reel for film and tape of any predetermined size; latch members disposed in said drive shaft and adapted to engage said notches in said spindle shank; means carried by said drive shaft for releasing said latch members for removal of said spindle from said bore; and means effective to force said spindle outwardly of said bore upon release of said latch means.

10. A rewind device for film and tape comprising: a body portion defining a base and upright frame having integral journal means to receive and support a crank shaft and a drive shaft; a crank shaft journalled in said frame and drivingly connected to a drive shaft journalled adjacent the top of said body frame, and having an axial bore dimensioned to receive a reel supporting spindle; a spindle member having an extended shank portion diametrically opposite notches in the periphery thereof, said spindle being dimensioned to support a predetermined plurality of reels for film and tape of any predetermined size; latch members disposed in said drive shaft and adapted to engage said notches in said spindle shank; means for releasing said latch members for removal of said spindle from said bore; and resilient means to force said spindle outwardly of said bore upon release of said latch means.

11. The invention in accordance with claim 10 in which the latch means for locking said spindle shank in said drive shaft bore comprise: a pair of latch members pivotally mounted in diametrically opposite slots in the side wall of said tubular drive shaft, said latch members having inward projections therefrom normally disposed within the bore of said drive shaft, said projections being enterable in said longitudinal notches in said spindle shank; and spring means positioned around said drive shaft over said slots and said latch members pivoted therein, said spring means being adapted to hold said latch members with the projections thereof disposed inwardly of said bore.

12. The invention in accordance with claim 10 in which the means for releasing said latch means to permit removal of the spindle from the drive shaft comprise: a bolt-like release pin rotatably secured within said drive shaft bore and terminated inwardly in an end section of ovaloid conformation disposed between the movable ends of said latch members, and terminated outwardly in a handle section, said release pin having an axial bore therethrough.

13. In a spindle driving mechanism having a spindle with key means adapted to engage a hub mounted thereon, and a drive shaft for supporting and driving said spindle having a section with means engageable with a power source, an improved coupling means for locking said spindle and said drive shaft together in firm longitudinal and rotational engagement, comprising: a shank portion with notches in the periphery thereof; a shaft portion having a bore adapted to receive said shank; latch means carried by said shaft portion and engageable with said notches in said shank; means for releasing said latch means to permit removal of the shank from said bore; and means effective to force said shank outwardly of said bore upon release of said latch means.

References Cited in the file of this patent
UNITED STATES PATENTS

| | | |
|---|---|---|
| 735,429 | Waters | Aug. 4, 1903 |
| 748,527 | Peterson | Dec. 29, 1903 |
| 901,590 | Butlin | Oct. 20, 1908 |
| 1,118,456 | Wilkin | Nov. 24, 1914 |
| 2,392,966 | Baia | Jan. 15, 1946 |
| 2,615,643 | Barsam | Oct. 28, 1952 |
| 2,734,413 | Dunkelberger | Feb. 14, 1956 |